United States Patent [19]

Cipelletti

[11] 4,446,778

[45] May 8, 1984

[54] PASTEURIZATION SYSTEM WITH HEAT RECOVERY

[75] Inventor: Alberto Cipelletti, Guardamiglio, Italy

[73] Assignee: Frigomat S.a.s. di Alberto Cipelletti & C., Milan, Italy

[21] Appl. No.: 416,395

[22] Filed: Sep. 9, 1982

[30] Foreign Application Priority Data

Sep. 10, 1981 [IT] Italy .................................. 23878 A/81

[51] Int. Cl.³ ............................. A23C 3/04; A23C 9/00
[52] U.S. Cl. ........................................ 99/455; 99/470; 99/483; 99/486; 99/516
[58] Field of Search ........................ 99/451, 452–455, 99/467, 468, 470, 473–475, 483, 486, 516, 487; 426/397; 422/25, 105, 74, 114, 115, 302, 304

[56] References Cited

U.S. PATENT DOCUMENTS

4,263,254  4/1981  Huling .............................. 99/483 X

Primary Examiner—Timothy F. Simone
Attorney, Agent, or Firm—Millen & White

[57] ABSTRACT

A pasteurization system for dairy farming products, comprises several basins wherein the pasteurization cycle is effected in sequence so that the heat taken from a basin during cooling phase of the same is utilized to effect the heating phase of one or more basins. This is realized by means of a refrigerating circuit working also as heat pump with a heat exchanger at the end of hot and cold parts. Circuit can be selectively connected with its hot or cold parts to the heating or cooling coil provided for each basin.

8 Claims, 1 Drawing Figure

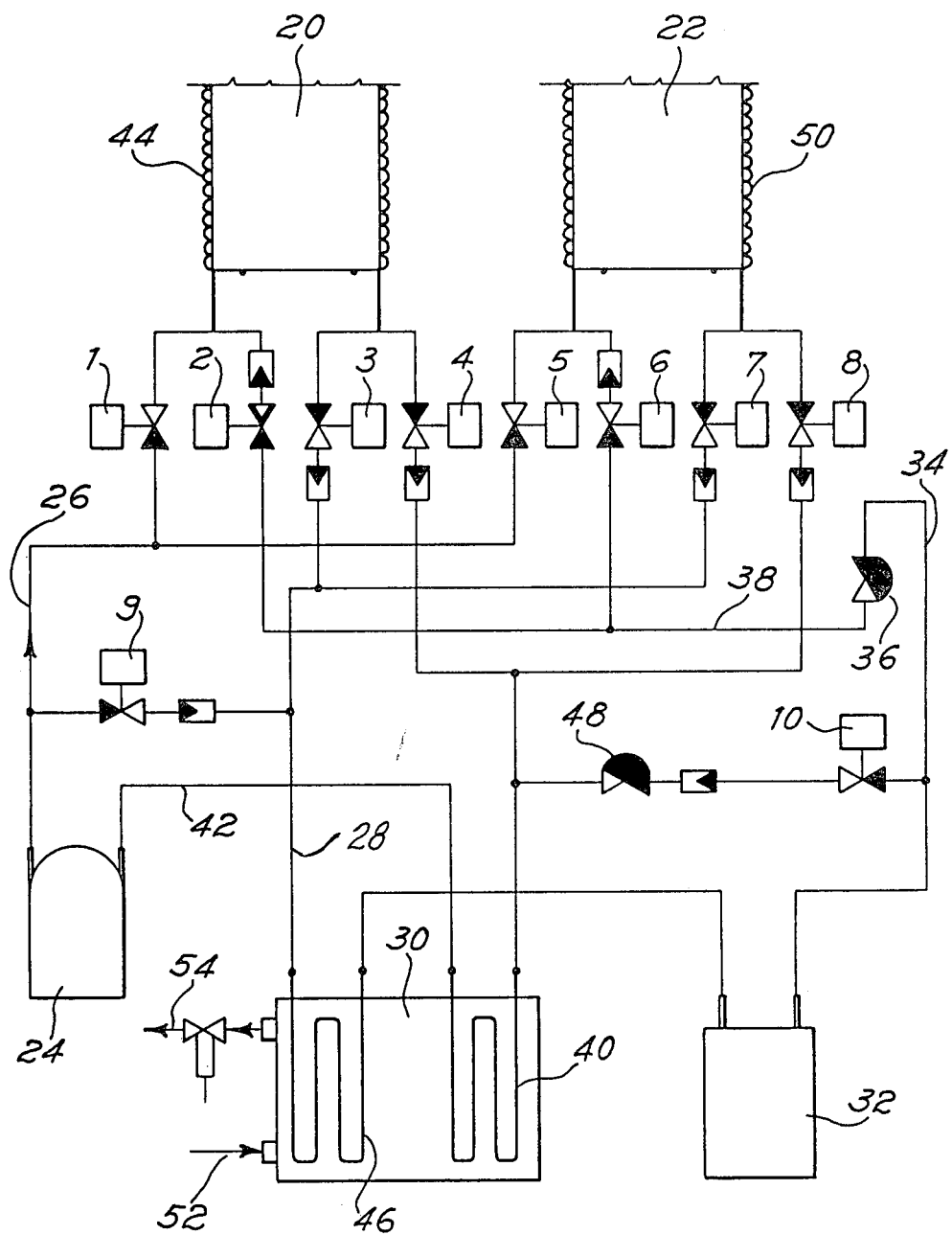

PASTEURIZATION SYSTEM WITH HEAT RECOVERY

BACKGROUND OF THE INVENTION

1. Field of the Invention

This invention relates to a pasteurization system for dairy farming products, particulary for milk, which utilizes two or more basins wherein the product is heated until a pasteurization temperature is reached and then cooled until it reaches preservation temperature. This system realizes the cycle in sequence in several basins so that heat coming from a basin during cooling is completely or partially utilized to heat one or more other basins.

2. Description of the Prior Art

This type of pasteurization system has been already proposed in order to reduce, especially in high capacity systems, the equipment cost and moreover, to reduce the installed horsepower, the energy consumption and the cooling water when it is utilized.

This known prior art system comprises, for every pasteurization basin, two separated coils, respectively a heating and a cooling coil, which can be selectively connected to the cold part or heat part of a refrigerating circuit adapted for operating at the same time as heat pump and having a heat exchanger between the ends of heat and cold parts. Although this solution has considerable advantages compared with other traditional equipment, as above mentioned, it involves some structural complexity due to the presence of two distinct circuits connected with each basin.

Moreover, this solution presents a lower efficency in the system due to thermal inertia, and especially because each circuit has a limited thermal exchange surface with the basin.

SUMMARY OF THE INVENTION

Objects of the present invention are to eliminate these drawbacks of cited known prior art systems, improving the system efficency and enabling the realization of the system as modular components, connectable between them, to increase at will the system capacity.

Accordingly, with the invention this is realized by means of a system comprising: a refrigerating circuit having a part wherein a hot fluid circulates, downstream from this part is a compressor, and a part wherein a cold fluid circulates downstream from an expansion valve or the like. A heat exchanger is placed between the ends of said parts of the circuit, and a coil is arranged in condition of thermal exchange with every basin for a fluid circulation therethrough, and with valve means for selectively inserting coil in a part of circuit wherein hot or heated fluid streams are circulated, or in a part of circuit wherein cold or cooled fluid streams are circulated, or to insulate said coil.

BRIEF DESCRIPTION OF THE DRAWINGS

The only FIGURE is a schematic diagram of the system according to the invention.

DESCRIPTION OF PREFERRED EMBODIMENT

The shown schematic diagram relates, simply, to the utilization of two pasteurization basins, respectively identified as 20 and 22, but the system can be used with more basins and indeed, the more the basins, the better the results.

Accordingly with this schematic diagram, a compressor 24 sends hot fluid through a conduct 26 which leads to one of two basins 20 and 22, and which presents a return part 28 which ends into a heat exchanger 30 and into a condensate trap 32.

From the trap 32 the fluid begins the "cold" part of the circuit, through the conduit 34 which leads to an expansion valve 36 and to a conduit 38 which is able to feed the circuits of basins 20 and 22. The conduit 38 passes to 40 through heat exchanger 30 and it connects with conduit 42 and again with the compressor 24 to complete the cycle. References 1 to 10 show the control valves of circuit; some of them are provided with non-return valves, as it is shown schematically.

Working of shown circuit is essentially as follows: initially the first basin 20 must be warmed by means of the hot fluid sent by compressor 24. In this case, valves 1, 3 and 10 are opened, while other valves are closed. The cycle starts from the compressor 24 in the conduit 26, through valve 1 into coil 44 of basin 20, to warm the latter until desired temperature. Fluid leaving coil 44, passes through valve 3, conduit 28, coil 46 into heat exchanger 30 and goes into the condensate trap 32. From the latter, the fluid is sent through valve 10, expansion valve 48, coil 40 into the heat exchanger 30 and conduit 42, and then it returns to the compressor 24. In this case, refrigerating system works as a heat pump. In the following phase, basin 20 is cooled from pasteurization temperature (about 80°-85° C.) to preservation temperature (about 20° C.) while at the same time basin 22 is heated until pasteurization temperature.

In this case, valves 2, 4, 5 and 7 are opened, while other valves are all closed. Cycle starts from compressor 24 and from conduit 26 through valve 5, so that hot fluid passes through coil 50 of basin 22, leaving coil 50 through valve 7 to reach coil 46. Through the cold part of circuit, fluid passes in conduit 34 and expansion valve 36, arriving through conduit 38 and valve 2, into coil 44 of basin 20, fluid then comes out, through valve 4 to pass into coil 40, into conduit 42 and into compressor 24 again.

In this phase the energy recuperation is realized since, as it is easy to verify, the heat released from basin 20 during cooling phase is utilized to heat basin 22 and the circuit works at the same time as a refrigerating circuit and as heat pump.

In the preferred case in which several basins are provided, heat coming from cooling of basin 22 is exploited to heat the next basin, the preservation temperature is maintained in basin 20 by periodically opening, for a short time, valves 2 and 4 thereof.

When it is required to conduct only a basin cooling, for example, of basin 22, the circuit is arranged so that only valves 6, 8 and 9 are open.

Thus, hot fluid coming from compressor 24 passes through valve 9 and directly goes into coil 46 of heat exchanger 30, while cold fluid passes through valve 6 into coil 50 and comes back, through valve 8, to coil 40, conduit 42 and compressor 24. In this case, since there is no heat recovery, conveniently heat is substracted from heat exchanger 30, for example, by means of a water circulation through inlet 52 and through outlet 54 of the same, or by means of a forced air circulation when the exchanger is of air exchange type. Using only one coil 44 and 50 for every basin, it is possible to simplify the construction of same, to reduce thermal inertia phenomenon during passage from heating to cooling, since the fluid is completely replaced, but expecially it is possible to now have, in every phase, an ample thermal exchange surface and thus a highly efficient heat transfer, which enables a further installed horsepower reduction, and then an energy consumption reduction.

The structure of above mentioned system enables realization of the same with modular criterion, since any number of basins can be connected to only one refrigerator, every basin being realizable in an independent way, with its own coil and inlet and outlet valves, so as to vary system capacity according to need, without modifying the energetic part of the system. With the embodiment according to the invention, expecially with a number of basins equal to or higher than three, it is possible to obtain installed horsepower reductions of 60-70% reductions of used energy of 50-60% and a water consumption reduction, when the heat exchanger is of this type, of 90% with an apparatus that costs less than traditional apparatuses.

As above mentioned, the invention can be applied also when the number of basins is higher than two and the system can be modified in the details, expecially for fitting to several operating requirements, without departing from the spirit and scope of present invention. For example, the coils connected with every basin can be separated from the refrigerating circuit and they can be thermically connected with cold or hot parts of the latter by means of heat exchangers.

I claim:

1. A pasteurization system comprising: a plurality of basins, with said system adapted for effecting in each basin a heating of a product therein to a pasteurization temperature followed by a cooling to a preservation temperature, and arranged for conducting said heating and cooling sequentially from basin to basin whereby as heat is liberated from a basin undergoing cooling, said liberated heat is at least partially utilized to effect heating of another basin, and wherein said system for heating and cooling said plurality of basins comprises; a refrigeration circuit having a first part arranged downstream from a compressor for circulating hot fluid therethrough, a second part arranged downstream from an expansion valve for circulating cooled fluid therethrough, heat exchanging means arranged connected between the ends of said first and second parts, a plurality of coils, corresponding to said plurality of basins, each arranged thermally connected with a respective basin and for effecting fluid circulation through each coil, and valve means arranged for selectively connecting each coil of each basin selectively to different parts of said refrigeration circuit to effect one of circulating a hot fluid stream therethrough, circulating a cold fluid stream therethrough, or circulating no fluid stream therethrough, whereby both heating and cooling of each basin is effected by means of the same coil.

2. A pasteurization system according to claim 1, wherein said refrigerating circuit includes connections connecting the delivery side and the return side of each one of said first hot and second cold parts, with said connections located upstream of said heat exchanger, and with bypass valves located at the connections between the delivery side and the return side of each one of said first hot and second cold parts.

3. A pasteurization system according to claim 2, wherein each basin is independent and modular in form, with each basin having its own coil and valve means for feeding, heating or cooling fluid thereto; and wherein two or more basins can be connected to said refrigerating circuit, to thereby provide a system with predetermined and variable capacity.

4. A pasteurization system according to claim 1, wherein said heat exchanger comprises a water containing tank having induction and exit means for water flow into and out of said tank.

5. A pasteurization system according to claim 4, wherein each basin is independent and modular in form, with each basin having its own coil and valve means for feeding heating or cooling fluid thereto; and wherein two or more basins can be connected to said refrigerating circuit, to thereby provide a system with predetermined and variable capacity.

6. A pasteurization system according to claim 1, wherein said heat exchanger comprises a cold and a hot radiator placed in thermal contact and fans for air circulation therebetween.

7. A pasteurization system according to claim 6, wherein each basin is independent and modular in form, with each basin having its own coil and valve means for feeding heating or cooling fluid thereto; and wherein two or more basins can be connected to said refrigerating circuit, to thereby provide a system with predetermined and variable capacity.

8. A pasteurization system according to claim 6, wherein each basin is independent and modular in form, with each basin having its own coil and valve means for feeding heating or cooling fluid thereto; and wherein two or more basins can be connected to said refrigerating circuit, to thereby provide a system with predetermined and variable capacity.

* * * * *